United States Patent
Newton et al.

(10) Patent No.: US 8,850,486 B2
(45) Date of Patent: Sep. 30, 2014

(54) METHOD AND APPARATUS FOR PROVIDING A USER INTERFACE

(75) Inventors: Philip Steven Newton, Eindhoven (NL); Jiska Margriet De Wit, Eindhoven (NL); Jeroen Ronald Johannes Van Der Putten, Eindhoven (NL); Wee Keng Koh, South Buckinghamshire (GB); Gerhardus Engbertus Mekenkamp, Eindhoven (NL); Alexis Stephen Richard Ashley, Redhill (GB)

(73) Assignee: Koninklijke Philips N.V., Eindhoven (NL)

( * ) Notice: Subject to any disclaimer, the term of this patent is extended or adjusted under 35 U.S.C. 154(b) by 1335 days.

(21) Appl. No.: 10/483,866

(22) PCT Filed: Jul. 15, 2002

(86) PCT No.: PCT/IB02/02976
§ 371 (c)(1),
(2), (4) Date: Jan. 14, 2004

(87) PCT Pub. No.: WO03/009583
PCT Pub. Date: Jan. 30, 2003

(65) Prior Publication Data
US 2004/0172388 A1    Sep. 2, 2004

(30) Foreign Application Priority Data
Jul. 19, 2001    (EP) ...................................... 01202759

(51) Int. Cl.
*H04N 7/10*    (2006.01)
*H04N 7/025*    (2006.01)
*H04N 5/445*    (2011.01)
*G06F 3/00*    (2006.01)
*G06F 13/00*    (2006.01)
*H04N 21/232*    (2011.01)
*H04N 21/482*    (2011.01)

(52) U.S. Cl.
CPC ......... *H04N 21/232* (2013.01); *H04N 21/4828* (2013.01)
USPC ................... 725/53; 725/32; 725/39; 725/40; 725/60; 725/61

(58) Field of Classification Search
CPC ......................... H04N 21/232; H04N 21/4828
See application file for complete search history.

(56) References Cited

U.S. PATENT DOCUMENTS

| | | | |
|---|---|---|---|
| 5,809,471 A * | 9/1998 | Brodsky | 704/275 |
| 6,211,919 B1 | 4/2001 | Baker | |
| 6,415,099 B1 * | 7/2002 | Berger | 386/83 |
| 6,637,029 B1 * | 10/2003 | Maissel et al. | 725/46 |
| 6,825,849 B1 | 11/2004 | Minakuchi | |

(Continued)

FOREIGN PATENT DOCUMENTS

| | | |
|---|---|---|
| WO | 0104782 A2 | 1/2001 |
| WO | 0115449 A1 | 3/2001 |

*Primary Examiner* — Justin Shepard

(57) ABSTRACT

When the user views the information available on a program (in a Personal Video Recorder), the keywords that determine whether a program will be recorded are accentuated. This can be done by using the size of the text or by using colors or any other kind of varying accentuation i.e. encircled or blinking text. This makes it easy for the user to identify the keywords used in their personalized profile. Additionally the user can navigate between keywords and change the accentuation of the keywords, to indicate a rating (in multiple levels) of the keyword.

12 Claims, 1 Drawing Sheet

(56) References Cited

Figure 1:
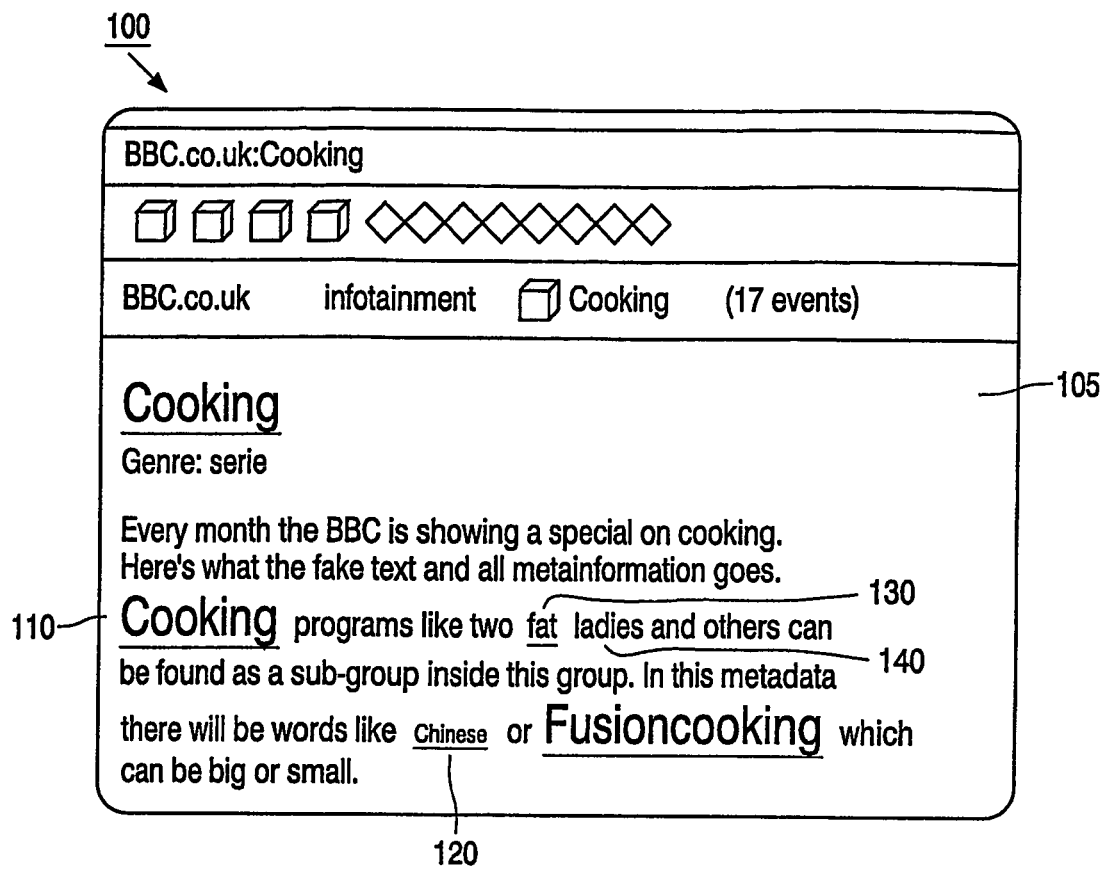

U.S. PATENT DOCUMENTS 6,961,724 B1* 11/2005 Kindo et al. .................. 707/4
2002/0056082 A1* 5/2002 Hull et al. .................... 725/1
2002/0056106 A1 5/2002 Takahashi
2002/0072895 A1* 6/2002 Imanaka et al. .............. 704/9
2002/0083468 A1* 6/2002 Dudkiewicz ................ 725/133
2003/0014753 A1 1/2003 Beach

* cited by examiner

METHOD AND APPARATUS FOR PROVIDING A USER INTERFACE

The invention relates to a method for providing a user interface for displaying an information unit comprising at least on symbol.

The invention also relates to a computer program for enabling a processor to carry out the method for providing a user interface for displaying an information unit comprising at least on symbol.

The invention also relates to a tangible medium carrying a computer program.

The invention also relates to a signal carrying a computer program.

The invention also relates to an apparatus for providing a user interface for displaying an information unit comprising at least on symbol.

In typical personal video recorders (i.e. TiVo, ReplayTV) a user can request information on a program, such as the title, genre and the synopsis. Additionally a user can give a rating to a program. This rating is fed to a personalized profile. This personalized profile is usually based on a rating of specific keywords. If words or symbols like faces matching these keywords appear in a program's description (also referred to as metadata) than a recording agent in the system will determine by using the rating of those keywords whether this program should be recorded or not.

When the user views the information available for a recorded program, he cannot immediately identify why the system has recorded or will record a particular program. Also, the user cannot directly influence the rating of and get feedback on, the keywords used in the personalized profile.

It is an object of the invention to improve feedback on the keywords that have been used by determining whether a program should have been or will be recorded or not.

This object is reached by the method according to the invention, wherein the method comprises the following steps: comparing the symbol with at least one keyword comprised in a personalized profile wherein the keyword is associated with a rating; and while displaying the information unit, accentuating the symbol matching the keyword, the accentuation corresponding to the rating associated with the keyword.

When the user views the information available on a program, the keywords that determine whether a program will be recorded are accentuated. This can be done by using the size of the text or by using colors or any other kind of varying accentuation i.e. encircled, or blinking text. This makes it easy for the user to identify the keywords used in their own personalized profile.

An embodiment of the invention further comprises the steps of: changing the accentuation of a symbol comprised by the information unit by user operable input means; adapting the personalized profile to comprise a keyword corresponding to said symbol; and associating a rating with the keyword, the rating corresponding to the accentuation of said symbol.

Additionally, the user can navigate between the accentuated keywords and change the accentuation (for instance the size) of the keywords, to indicate his like or dislike (in multiple levels) of the subject that the keyword represents. This is then used as a direct input for the personalized profile.

The apparatus according to the invention comprises means for comparing the symbol with at least one keyword comprised in a personalized profile wherein the keyword has a rating associated with it; and means for accentuating the symbol matching the keyword while providing a signal for displaying the information unit, the accentuation corresponding to the rating associated with the keyword.

Figure 2:
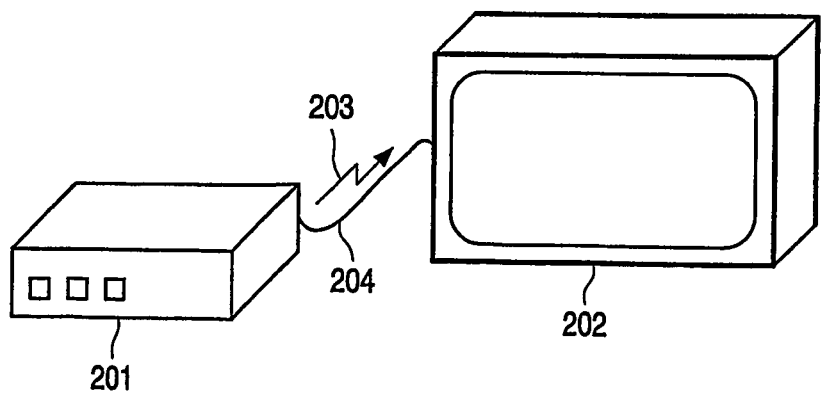

The invention and embodiments thereof will be described in more detail by means of the following Figures, in which FIG. 1 shows an implementation of an embodiment of the method according to invention; and FIG. 2 shows a set-up of an embodiment of the apparatus according to the invention.

When the user views the information 105 available on a program, the keywords that determine whether a program will be recorded are accentuated. This can be done by using the size of the text or by using colors or any other kind of varying accentuation i.e. encircled, underlined or blinking text. This makes it easy for the user to identify the keywords used in their own personalized profile.

Additionally, the user can navigate between the accentuated keywords and change the accentuation (for instance the size) of the keywords, to indicate his like or dislike (in multiple levels) of the subject that the keyword represents. This is then used as a direct input for the personalized profile. For instance when the user enjoys watching cooking programs he may enlarge the cooking keyword 110 in a description of a cooking program (see FIG. 1: program information). The system then knows that the user likes cooking programs and adjusts the personalized profile accordingly. The opposite of course applies when the user dislikes Chinese cooking programs, he will then reduce the size of Chinese keyword 120. Using this feature has the additional benefit that a greater granularity can be obtained in the personalized profile. For example the user may especially like programs on fusion cooking higher than cooking programs in general. Other users using the same system may not like cooking. So when they view the same program information, they can make the "cooking" keyword smaller. Because each user has his own profile, each user can specify his rating of a keyword.

Besides accentuating the keywords in a program description, the system can also show the relation between keywords by for instance using colors, underline them or generally give them a similar look. (a different look of course from the other works in the description) the user can then change the accentuation between those keywords. So for instance in FIG. 1, the user can enlarge the word "fat" 130 but not enlarge the word "ladies" 140 to indicate that he wants to give the keyword "fat" a high rating, but not the phrase "two fat ladies" as a whole. This allows the user to rate keywords in context.

Further situations wherein embodiments of the method according to the invention may be used are:

Subtitles:

The keywords that appear in the subtitles of a program can be accentuated (highlighted, bold-font etc.). In this way, the user immediately recognizes why the program was selected by the system for recording.

Ceefax:

The same that applies for metadata in a PVR system can also apply for program information on Ceefax. The keywords in a program description on Ceefax can be accentuated; this has the additional benefit that the user sees at a glance what the program is about.

Webpages

The use in a web page is especially interesting. If the concept is applied to web pages in search engines, then it can be used to perform a refined search. So not only does the user immediately see why a page was returned in the result, he can also change the importance of a keyword (by for instance changing its size, highlighting etc.) to refine the search.

In a further embodiment of the invention, a software module can display the information on a program to the user and accentuate the keywords used in the personalized profile. The degree of accentuation is determined by the rating a keyword has in the personalized profile. The software module can allow the user to select the keywords and change the degree of accentuation to indicate the rating for the subject that the keyword represents.

The application can be a user interface feature 100 for all types of personal video recorders or set-top boxes that use personalized profiles an rating as a basis for automatic recording as shown in FIG. 2. The user interface is generated by the personal video recorder 201 and displayed by the TV set 202 by providing a signal 203 over link 204.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A method for providing a user interface for providing an information unit relating to a program, including a title and/or genre/synopsis of the program and at least one word or symbol, the method comprising:
    determining whether to recommend/record the program, using a personalized profile having at least one keyword associated with a rating;
    comparing the word or symbol in the information unit with the at least one keyword in the personalized profile;
    while displaying the information unit relating to the program, accentuating, in the displayed information unit a word or symbol matching a keyword in the personalized profile, the accentuation corresponding to the rating associated with the keyword in the personalized profile; and
    changing the accentuation of a word or symbol displayed in the information unit by user operable input means.

2. The method according to claim 1, wherein the step of providing the information unit comprises the step of: searching a database comprising further information units.

3. The method according to claim 1, wherein the information unit is one of the following:
    (a) At least one line of subtitles associated with a television program
    (b) A teletext page
    (c) A web-page.

4. The method according to claim 1, wherein the accentuation is changed by changing one or more of symbol display size, color, highlighting, or blink rate.

5. The method according to claim 1, wherein changing the accentuation includes changing a level of highlighting and further including:
    changing the rating by changing the level of highlighting of the corresponding symbol.

6. A tangible medium carrying a computer program to be executed on a computing device for providing a user interface for providing an information unit relating to a program, including a title and/or genre/synopsis of the program and at least one word or symbol, said medium comprising:
    code determining whether to recommend/record the program, using a personalized profile having at least one keyword associated with a rating;
    code for comparing the word or symbol in the information unit with the at least one keyword in the personalized profile;
    code for, while displaying the information unit relating to the program, accentuating, in the displayed information unit a word or symbol matching a keyword in the personalized profile, the accentuation corresponding to the rating associated with the keyword in the personalized profiled; and
    code for changing the accentuation of a word or symbol displayed in the information unit by user operable input means.

7. An apparatus comprising:
    a user interface including a user input and an information displaying unit for displaying text relating to a program, said text including a title and/or genre/synopsis of the program and at least one word or symbol;
    a means determining whether to recommend/record the program, using a personalized profile having at least one keyword associated with a rating;
    a means for comparing the word or symbol in the information unit with the at least one keyword in the personalized profile; and
    a means for accentuating, in the displayed text in the information display unit, each word or symbol matching one or more of the at least one keywords highlighting and displaying each associated accentuated word or symbol displaying on the information display unit, the accentuation corresponding to the rating associated with the keyword in the personalized profile; and
    wherein the user interface enables a user to chance the accentuation of a word or symbol displayed in the information unit.

8. The apparatus according to claim 7, wherein there are a plurality of levels of accentuation corresponding to different rating levels, each level having a different, corresponding display format.

9. The apparatus according to claim 8, wherein the different levels of accentuation are denoted by at least one of a size, highlighting color, and blink rate which the symbol is displayed.

10. The apparatus according to claim 8, further including:
    a means for concurrently changing an accentuation of a displayed accentuated symbol and a rating of the corresponding keyword.

11. An apparatus comprising:
    a display for displaying an information unit having text relating to a program, said text including a title and/or genre/synopsis of the program and at least one word or symbol;
    a user profile, the user profile including a plurality of keywords, each keyword having a rating indicative of a level of importance to a user;
    a user input device;
    a processor programmed to perform the steps of:
    comparing the keywords in the user profile to a plurality of words in an information unit relating to the program,
    causing the display to display the information unit with the keywords accentuated wherein, each word or symbol matching one or more of the at least one keywords highlighting and displaying each associated accentuated word or symbol displaying on the display, the accentuation corresponding to the rating associated with the keyword in the user profile; and
    wherein the user input device enables a user to change the accentuation of a word or symbol displayed in the information unit.

12. The apparatus according to claim 11, wherein the accentuation of the displayed keywords is changed by changing at least one of a color, size, highlighting, and blinking rate of each displayed keyword.

* * * * *